United States Patent [19]

Fisch

[11] Patent Number: 4,986,912
[45] Date of Patent: Jan. 22, 1991

[54] DISPOSABLE INSERT FOR A FLUID FILTRATION CANISTER

[75] Inventor: Alfred C. Fisch, Clarkston, Mich.
[73] Assignee: Oakland Engineering, Inc., Pontiac, Mich.
[21] Appl. No.: 367,321
[22] Filed: Jun. 16, 1989
[51] Int. Cl.$^5$ .............................................. B01D 29/27
[52] U.S. Cl. .................... 210/448; 210/452; 55/363; 55/378; 55/381
[58] Field of Search .............. 210/445, 448, 451, 452, 210/453; 55/361, 363, 378, 381

[56] References Cited

U.S. PATENT DOCUMENTS 3,204,391 9/1965 Schwab .............................. 210/448
3,355,026 11/1967 Schut ................................. 210/448

Primary Examiner—Richard V. Fisher
Assistant Examiner—Wanda L. Millard
Attorney, Agent, or Firm—Barnes, Kisselle, Raisch, Choate, Whittemore & Hulbert

[57] ABSTRACT

A disposable filter bag insert for use in a filter canister assembly that comprises a rigid ring of diameter to overlie a shoulder on the canister and be sealingly captured between the canister base and top. A filter stock of sheet stock construction is suspended from the ring and has a lock stitch extending along the bottom and one side edge thereof. A section of oil-adsorbent material is likewise suspended from the ring, but covers less than the entire surface area of the sock, such that fluid flow through the sock continues even if the oil-adsorbent material becomes clogged. The sock lock stitch is specially contoured where it is looped over the ring for enhanced sealing capture between the canister top and base.

14 Claims, 2 Drawing Sheets

DISPOSABLE INSERT FOR A FLUID FILTRATION CANISTER

The present invention is directed to devices for separation of mixed fluids, and more particular to a disposable filter bag insert for a filtration canister assembly.

There are a number of applications in which it is desirable to remove specific or target fluids from one or more carrier fluids. One such application, in which the present invention finds particular utility, lies in removal of oils from paint and cleaning/rinsing solutions in automated automotive body and component painting and cleaning lines. It has heretofore been attempted to remove oily constituents from the paint by directing the paint through oil filtration media. However, such media in conventional devices rapidly becomes plugged or saturated, requiring frequent replacement and thereby increasing both the labor and material costs of the cleaning/painting operations.

A general object of the present invention is to provide an assembly for removing specific fluids from carrier fluids that overcomes the aforementioned deficiencies in the art. More specifically, an object of the present invention is to provide a disposable filter bag insert of a type suitable for use in otherwise conventional canister-type filter assemblies in which tendency to become plugged is greatly reduced while maintaining efficiency of specific fluid removal, thereby not only reducing paint defects in automotive cleaning/painting applications, for example, but also reducing labor and material costs associated with the painting operation. Another object of the present invention is to provide a disposable filter bag insert of the described character that is constructed for enhanced sealing capture between the base and top of the filter canister.

The invention, together with additional objects, features and advantages thereof, will be best understood from the following description, the appended claims and the accompanying drawings in which:

Figure 7:
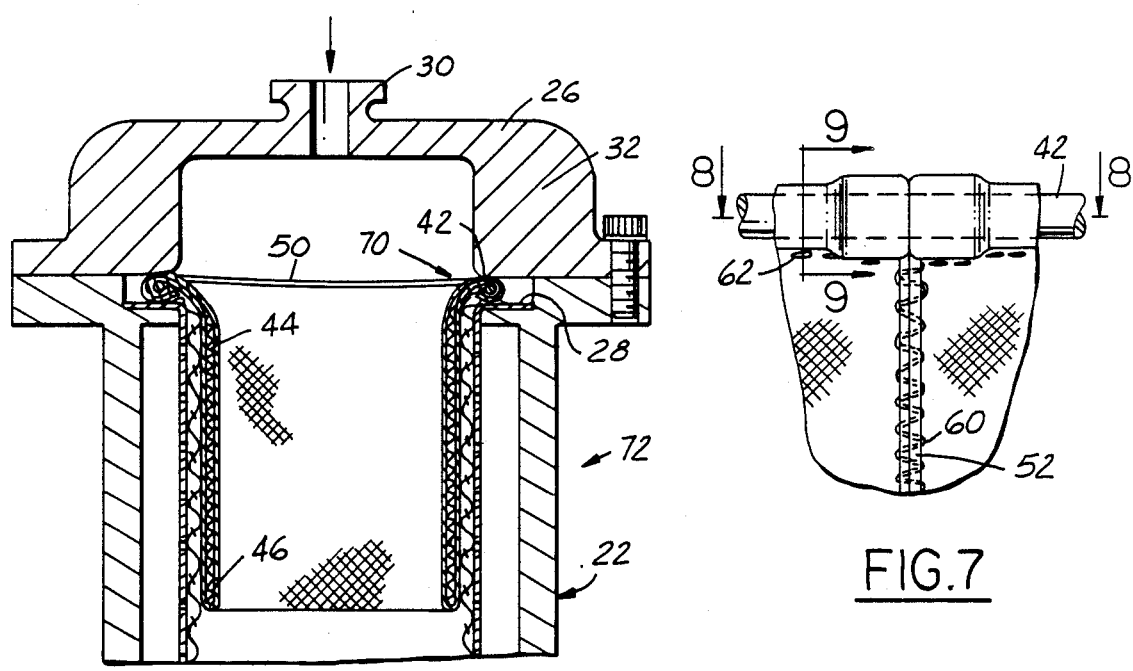
Figure 8:
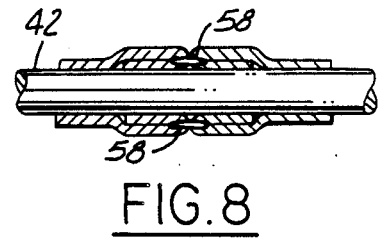
Figure 9:
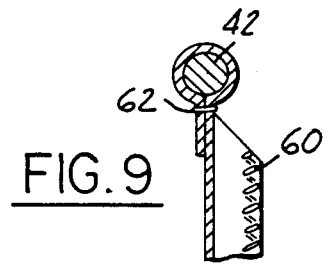
Figure 10:
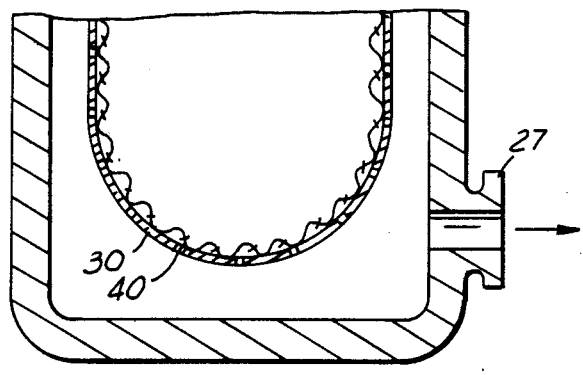

FIGS. 8 and 9 are sectional views taken substantially along the respective lines 8—8 and 9—9 in FIG. 7; and FIG. 10 is a fragmentary sectional view in side elevation showing a modified embodiment of the invention.

Figure 1:
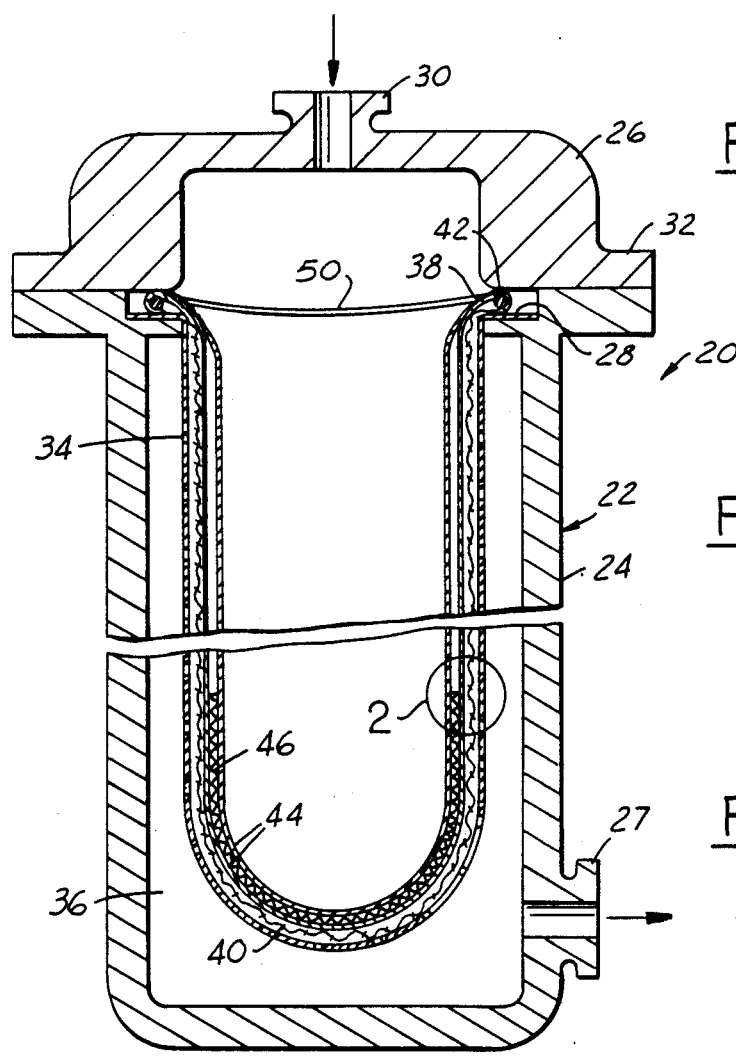
FIG. 1 is a fragmentary vertically sectioned elevational view of a filtration unit that employs a disposable filter bag insert in accordance with one presently preferred embodiment of the invention.

FIG. 1 illustrates a filter assembly 20 as comprising a canister 22 formed by a cup-shaped base 24 and an overlying top 26. Base 24 has a fluid outlet flange 27 projecting from the lower portion thereof, and an axially upwardly facing shoulder 28 at its open upper end. Top 26 has an inlet flange 30 and a periphery 32 removably assembled to the open end of canister base 24 so as to overlie shoulder 28. A basket 34 of perforated stainless steel or other suitable construction is suspended from shoulder 28 within the generally cylindrical interior cavity 36 formed by base 24 and top 26. A disposable filter bag insert 38 is likewise suspended from shoulder 28 within basket 34. To the extent thus far described, filter assembly 20 is of generally conventional canister-type construction, as illustrated, for example, in U.S. Pat. No. 3,771,664.

Figure 2:
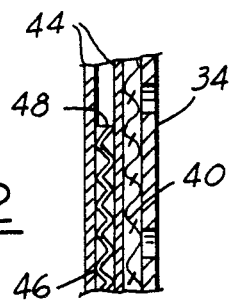
FIG. 2 is a fragmentary view on an enlarged scale of that portion of FIG. 1 enclosed by the circle 2.

In accordance with the present invention, filter bag insert 38 includes a sock 40 of flow-through filtration medium looped over and suspended from a rigid metallic ring 42 of diameter to be captured between periphery 32 and shoulder 28. A pair of liner layers 44 are likewise suspended from ring 42 within sock 40. A cup-shaped section 46 of a second filtration medium is positioned between liner layers 44 at the closed bottom of sock 40, and is of material characterized by a high surface affinity for a specific target fluid such as oil. It will be noted in FIGS. 1 and 2 that material section 46 covers substantially less than the entire flow-through surface area of sock 40, having an upper edge 48 that terminates well short of ring 42 at the upper edge of sock 40. A handle strip 50 of flexible material construction is suspended from ring 42 and extends diametrically across the open upper end of sock 40 to facilitate insertion and removal of filter bag insert 38 from within canister 22.

In operation, with canister top 26 removed, insert 38 is suspended from shoulder 28 within basket 34 by grasping handle 50 and dropping sock 40 into the basket. With ring 42 overlying shoulder 28, top 26 is reassembled to base 24 so as sealingly to capture ring 42, and sock material stitched thereover, between shoulder 28 and periphery 32. Fluid to be filtered, such as paint, is then cycled through filter assembly 20 from inlet 30 to outlet 27. The major portion of the fluid passes through sock 40 bypassing material section 46, while some portion of the fluid passes through material section 46 for removal of oil. Thus, fluid continues to flow even if the fluid is very oily and material section 46 rapidly becomes clogged. Preferably, material section 46 covers approximately one-third of the total filtration surface area of sock 40. When filter bag insert 38 requires replacement, either at preselected periodic replacement intervals or when it is noted that the oil is not being removed as efficiently as desired, top 26 is removed, insert 38 is grasped at handle 50, the insert is removed, and a new insert is rapidly placed in position with minimum line downtime.

A problem heretofore extant in the art lies in obtaining an efficient seal at ring 42 where sock material is looped and stitched thereover. Specifically, in insert bags in which the sock is of sheet construction and stitched along the bottom and one side edge, a substantial lump is formed at the seam joint where looped over and stitched to the ring according to conventional practice, forming an area for possible loss of sealing contact with ledge 28 and top periphery 32. In accordance with the preferred embodiment of the present invention as illustrated in FIGS. 3-9, the side seam in sock 40 is specifically contoured to overcome this problem in the art.

Figure 3:
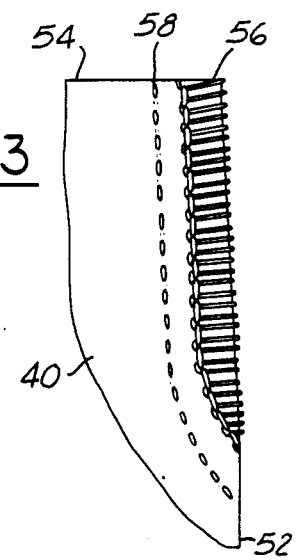
FIGS. 3-7 are fragmentary views that show a portion of the filter bag seam at successive stages of manufacture.
Figure 6:
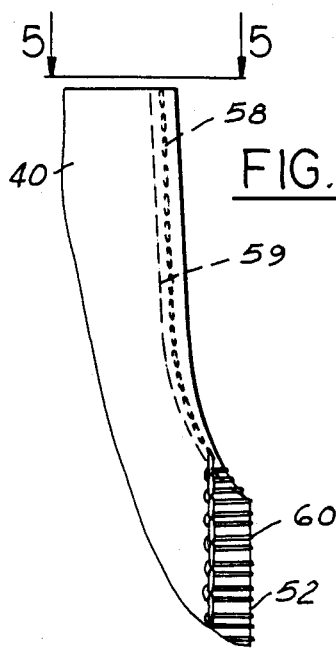
Figure 5:
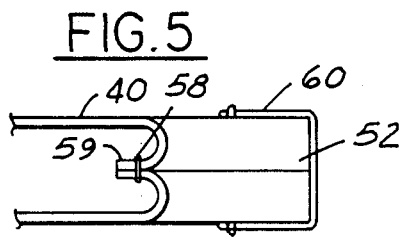
Figure 4:
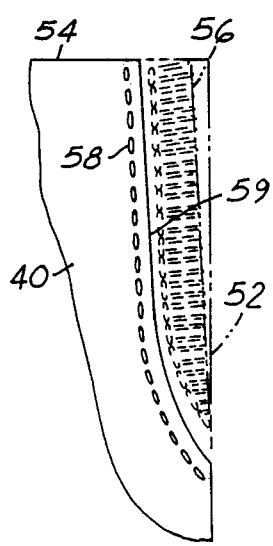

More specifically, sock 40 is formed by cutting a section of sheet stock and folding the sheet stock section inside out to align the side and top edges 52, 54 (FIG. 3). A lock stitch 56 is then formed at the corner of the aligned side and top edges, and an arcuate looper stitch 58 is formed to extend inside of the lock stitch 56. The sock edge is then cut along an arcuate line 59 (FIG. 4) between lock stitch 56 and looper stitch 58. The bag is then turned right side out so that the looper stitch 58 is now inside of the sock (FIGS. 5 and 6), and a vertical lock stitch 60 is formed along the remainder of side edge 52 and the bottom of the sock. Thus, lock stitch 60 is external to the sock, whereas looper stitch 58 is inside the sock at the upper edge thereof.

The upper portion of the sock is then externally looped around ring 42 (FIGS. 7-9), and a circumferential stitch 62 is formed entirely around the ring for fastening the sock to the ring. Handle strap 50 (FIG. 1) is also stitched into the bag assembly at this stage. It has been found that a stitching arrangement of the character described greatly reduces the material bulge where the sock seam is wrapped around the support ring, and thereby obtains enhanced sealing engagement between the canister top and shoulder.

FIG. 10 illustrates a modified embodiment 70 of the invention in which the section 46 of oil adsorbent material takes the form of a skirt directly suspended from ring 42 between liner layers 44. Filter assembly 72 in FIG. 10 is otherwise identical to assembly 20 hereinabove described in detail.

In working embodiments of the invention, sock 46 is of the following material: polypropylene felt. Material section 46 is of Processed polypropylene construction treated to have a high affinity for adsorption of oil.

The invention claimed is:

1. A disposable liquid filter bag insert for use in a liquid filter assembly that includes a canister having a generally cylindrical internal cavity formed by a cup-shaped base, a perforated basket within said base for supporting said bag insert against pressure of liquid flow therethrough and a top removably received on said base, said base having an outlet at a lower portion thereof and an upwardly facing shoulder at its open end, said top having an inlet and a periphery that overlies said shoulder, said disposable filter bag insert comprising:

a rigid annular ring of diameter to overlie said shoulder and be captured between said periphery and said shoulder, a sock having an open mouth affixed to said ring, a closed bottom and an overall inner surface area exposed for flow-through liquid filtration, and a section of filter material characterized by surface affinity for oil flexibly suspended from said ring within said sock and having an outer surface in facing contact with said inner surface of said sock over the entire outer surface of said section and over less than the entire inner surface area of said sock.

2. The insert as set forth in claim 1 wherein said filter material section comprises a skirt directly suspended from said ring at an upper portion of said sock around the entire circumference of said section and having an open lower end opening into said sock.

3. The insert as set forth in claim 1 wherein said filter material section comprises a cup-shaped section and a pair of liners respectively positioned internally and externally of said section suspending said section from said ring and disposed at said closed bottom of said sock.

4. The insert as set forth in claim 1 wherein said filter material section covers approximately one third of said entire surface area.

5. The insert as set forth in claim 1 wherein said sock is of sheet stock construction, having a vertical seam along one side thereof, and wherein said seam is undercut at an upper edge thereof and looped over said ring, said sock and ring being constructed for sealing engagement between said periphery of said top and said shoulder.

6. The insert as set forth in claim 5 wherein said seam comprises a double stitch external seam extending along said one side and said bottom of said sock, and a single stitch internal seam surrounding said ring.

7. The insert as set forth in claim 1 further comprising a handle of flexible material construction diametrically suspended from said ring across said open mouth of said sock.

8. A disposable filter bag insert for use in a filter assembly that includes a canister having a generally cylindrical internal cavity formed by a cup-shaped base and a top removably received on said base, said base having a fluid outlet at a lower portion thereof and an upwardly facing shoulder at its lower portion thereof and an upwardly facing shoulder at its open end, said top having an inlet and periphery that overlies said shoulder, said disposable filter bag comprising:

a rigid annular ring of diameter to overlie said shoulder and be captured between said periphery and said shoulder, and a sock of sheet construction and having an open mouth affixed to said ring, a closed bottom, a vertical seam along one side thereof and an overall inner surface area exposed for flow-through filtration, said seam being undercut at an upper edge thereof and looped over said ring, said sock and ring being constructed for sealing engagement between said periphery of said top and said shoulder.

9. The insert as set forth in claim 8 wherein said seam comprises a double stitch external seam extending along said one side and said bottom of said sock, and a single stitch internal seam surrounding said ring.

10. The insert as set forth in claim 8 further comprising a section of filter material characterized by surface affinity for oil flexibly suspended from said ring within said sock and having an outer surface in facing contact with said inner surface of said sock over the entire outer surface of said section over less than the entire surface area of said sock.

11. The insert as set forth in claim 10 wherein said filter material section comprises a skirt directly suspended from said ring at an upper portion of said sock.

12. The insert as set forth in claim 10 wherein said filter material section comprises a cup-shaped section and a pair of liners positioned internally and externally of said section suspending said section from said ring and disposed at said closed end of said sock.

13. The insert as set forth in claim 10 wherein said filter material section covers approximately one third of said entire surface area.

14. The insert as set forth in claim 8 further comprising a handle of flexible material construction diametrically suspended from said ring across said open mouth of said sock.

* * * * *